United States Patent [19]

Oshima et al.

[11] Patent Number: 4,882,897
[45] Date of Patent: Nov. 28, 1989

[54] CLUTCH CONTROL STRUCTURE FOR A WALKING OPERATOR TYPE LAWN MOWER

[75] Inventors: Hiroshi Oshima; Hirofumi Sadakane; Takao Katayama; Jinnosuke Takakura; Hisatake Fujioka, all of Sakai, Japan

[73] Assignee: Kubota, Ltd., Osaka, Japan

[21] Appl. No.: 274,116

[22] Filed: Nov. 21, 1988

[30] Foreign Application Priority Data

Nov. 28, 1987 [JP] Japan ................................ 62-301168
Nov. 30, 1987 [JP] Japan ................................ 62-304318

[51] Int. Cl.⁴ ............................................ A01D 69/00
[52] U.S. Cl. ................................................... 56/11.3
[58] Field of Search ...................... 56/11.3, 10.5, 10.8, 56/17.5; 74/480 R, 491; 180/19.3

[56] References Cited

U.S. PATENT DOCUMENTS

| | | | |
|---|---|---|---|
| 4,433,530 | 2/1984 | Schaefer | 56/10.8 X |
| 4,538,401 | 9/1985 | Takamizawa et al. | 56/10.8 X |
| 4,721,494 | 1/1988 | Hayashi et al. | 56/11.3 X |
| 4,747,256 | 5/1988 | Sadakane | 56/11.3 |
| 4,753,062 | 6/1988 | Roelle | 56/10.8 X |

FOREIGN PATENT DOCUMENTS 60-33785 10/1985 Japan.

Primary Examiner—Thuy M. Bui
Attorney, Agent, or Firm—Jordan and Hamburg

[57] ABSTRACT

A walking operator type lawn mower comprising a steering handle extending rearwardly thereof, a cutting blade clutch for making and breaking drive transmission to a cutting blade, and a clutch lever pivotable between a clutch engaging position adjacent the steering handle and a declutching position away from the steering handle. A manually operable interlocking member and a control device are provided between the clutch lever and the cutting blade clutch. The control device is constantly urged to a position to disengage the clutch. The interlocking member is switchable between a position to interlock the clutch lever and the control device and a position to release the two components from each other, and is constantly urged to the release position. The cutting blade clutch is engaged only when the interlocking member is maintained in the interlocking position and the clutch lever is moved to the clutch engaging position.

10 Claims, 6 Drawing Sheets

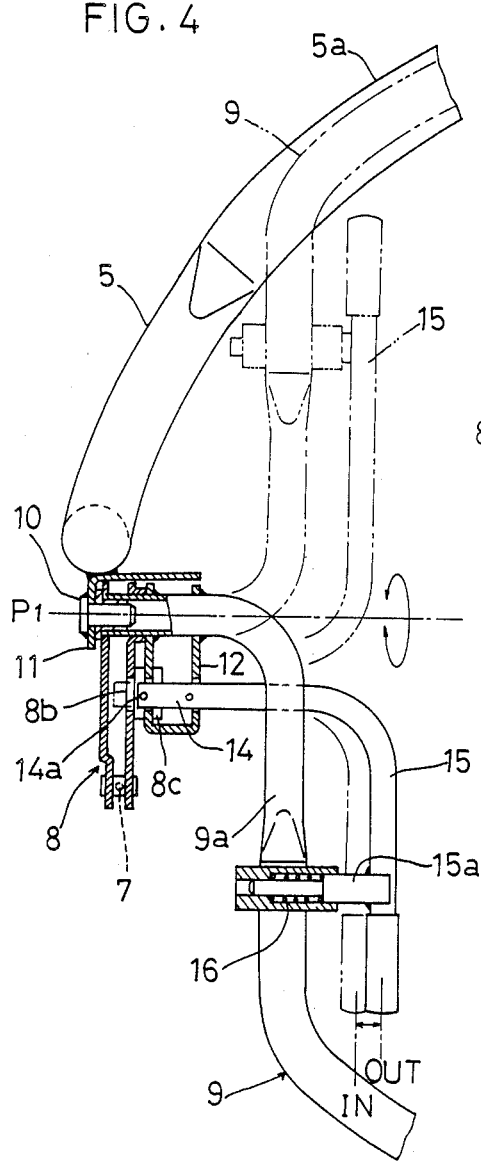
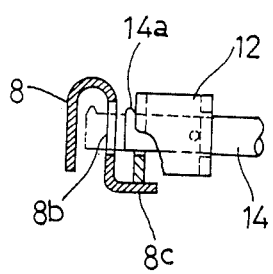
FIG. 4
FIG. 5

CLUTCH CONTROL STRUCTURE FOR A WALKING OPERATOR TYPE LAWN MOWER

BACKGROUND OF THE INVENTION

The present invention relates to a clutch control structure for a walking operator type lawn mower having a cutting blade clutch.

A known clutch control structure with a safety measure is disclosed in Japanese Utility Model Publication No. 60-33785, for example, in which the cutting blade is driven only after a manual operation of a clutch lever from a declutching position to a clutch engaging position and another manual operation different from this clutch lever operation. More particularly, a lock mechanism is provided for locking the clutch lever in the declutching position, which lock mechanism is urged to the locking position, and a manual control device is provided for operating the lock mechanism out of the locking position. When the cutting blade clutch is disengaged, the clutch lever is automatically locked in the declutching position. The cutting blade clutch is engaged by releasing the lever lock and switching the clutch lever.

In the known control structure, however, the operator may apply an undue operating force to the clutch lever, forgetting to release the lever lock. The operating force thus applied tends to result in deformation or damage of the clutch lever or of the locking mechanism acting as a safety device.

SUMMARY OF THE INVENTION

A primary object of the present invention is to provide a simple clutch control structure for a walking operator type lawn mower incorporating a safety measure and capable of avoiding damage due to an operational error.

In order to achieve this object, a clutch control structure for a walking operator type lawn mower according to the present invention comprises a cutting blade clutch for making and breaking drive transmission to a cutting blade, a steering handle including a grip portion, a clutch lever pivotable between a first position and a second position, a control device operatively connected to the cutting blade clutch and pivotable between a first corresponding position corresponding to the first position for engaging the cutting blade clutch and a second corresponding position corresponding to the second position for disengaging the cutting blade clutch, the control device being constantly urged to the second corresponding position for disengaging the cutting blade clutch, and an interlocking member manually switchable between a release position for breaking an engagement between the control device and the clutch lever to allow the control device and the clutch lever to be operable independently of each other, and an operative position for establishing the engagement between the control device and the clutch lever to allow the control device and the clutch lever to be operable together, the interlocking member being constantly urged to the release position, wherein the cutting blade clutch is engaged by maintaining the interlocking member in the operative position and moving the clutch lever to the first position.

In the above construction, the interlocking member remains in the release position unless a manual operating force is applied thereto. The cutting blade clutch is engaged only when the interlocking member is switched to the operative position and the clutch lever is moved to the first position. When the clutch lever is switched without switching the interlocking member, the clutch lever alone moves without effect since the clutch lever is not interlocked with the control device. Thus the cutting blade clutch is not engageable at this time.

Because of the mounting and urging construction for the interlocking member, the cutting blade clutch is engaged only with two manual operations, i.e. the operation to switch the clutch lever and the operation of the interlocking member. This feature provides the safety measure noted hereinbefore.

When the clutch lever alone is operated, the clutch lever makes a lost motion absorbing the operational force. Consequently, an operational error in operating the clutch lever alone hardly results in deformation or damage. The clutch control structure of the present invention is thus trouble-free and reliable.

Other objects, features and advantages of the present invention will be apparent from the following description.

BRIEF DESCRIPTION OF THE DRAWINGS

The drawings show clutch control structures for a walking operator type lawn mower according to the present invention, in which:

FIG. 4 is a rear view of an interlocking mechanism,

FIG. 5 is a sectional view of a clutch device,

DESCRIPTION OF THE PREFERRED EMBODIMENTS

Figure 1:
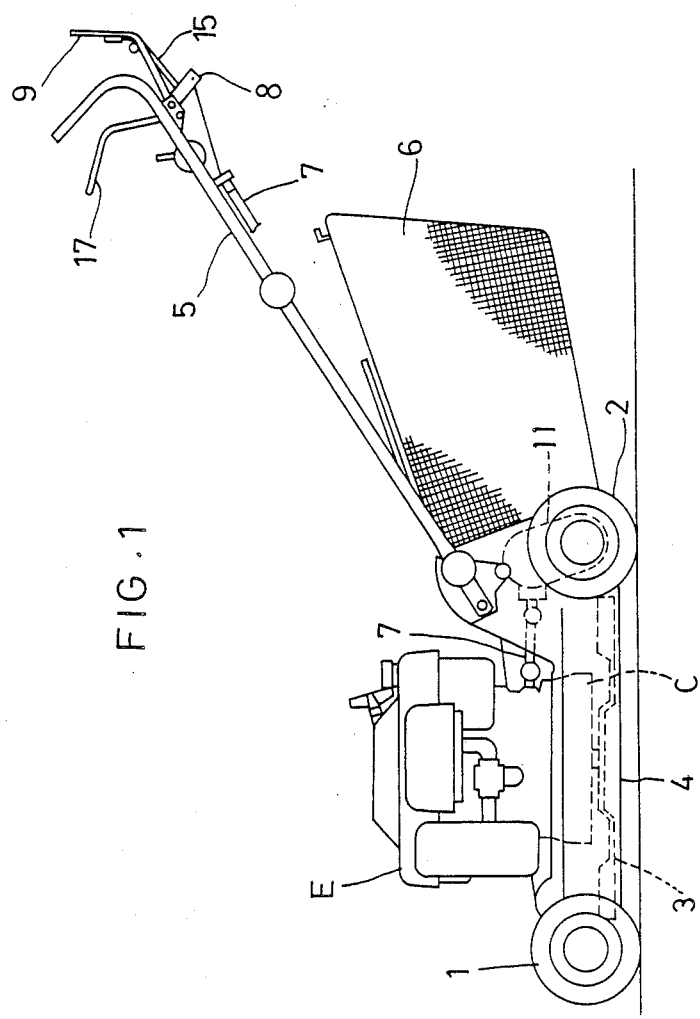
FIG. 1 is a side elevation of the lawn mower.

Referring to FIG. 1, a self-propelled, walking operator type lawn mower comprises front wheels 1, rear wheels 2, a cutting blade 3 mounted for rotation on a vertical axis in a blade housing 4, and an engine E mounted above the blade housing 4 for driving the rear wheels 2 and the cutting blade 3. A steering handle 5 and a grass catcher 6 extend rearwardly of the blade housing 4.

Figure 2:
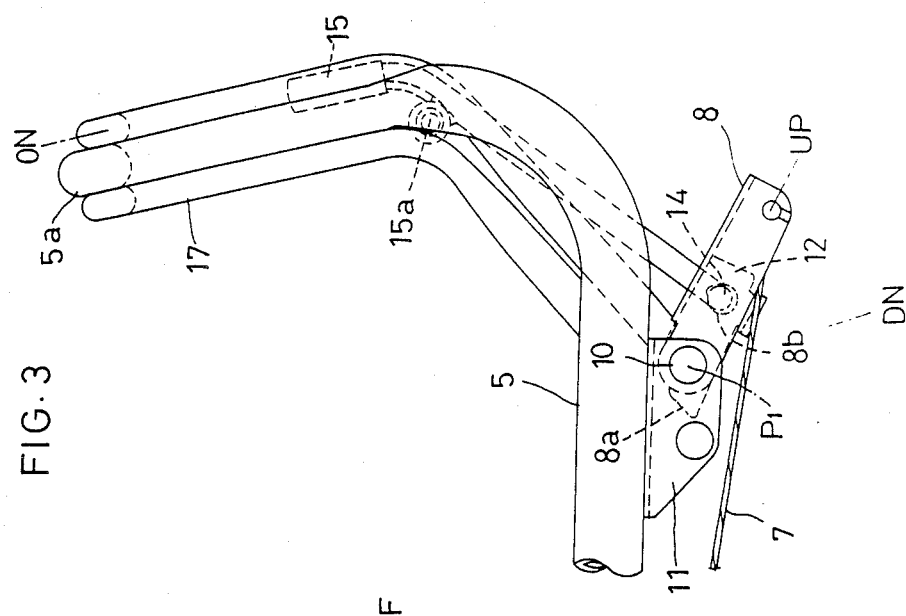
FIGS. 2 and 3 are side views of a clutch lever mounting section, respectively.
Figure 3:
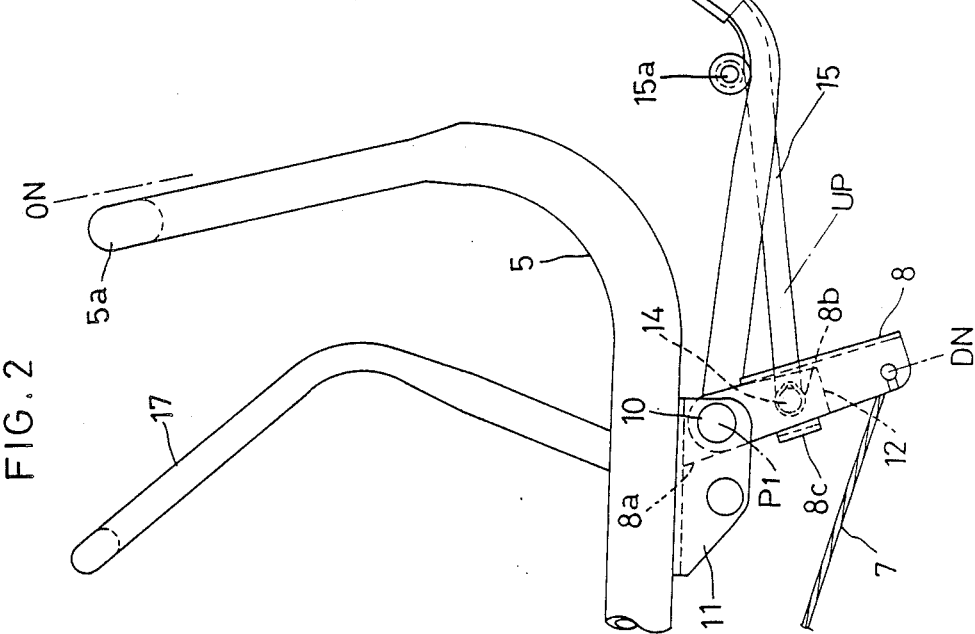
Figure 6:
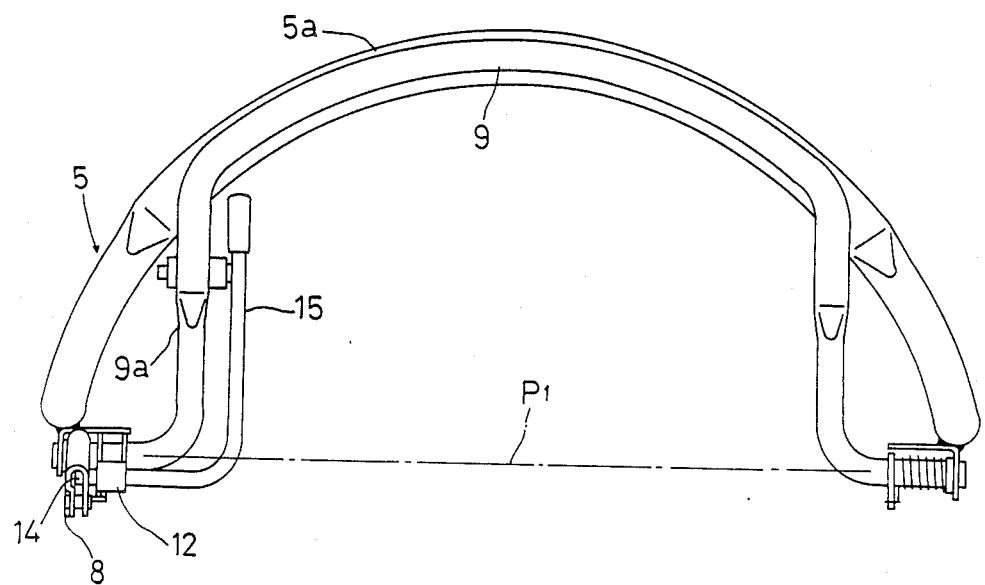
FIG. 6 is a rear view of a clutch lever.
Figure 12:
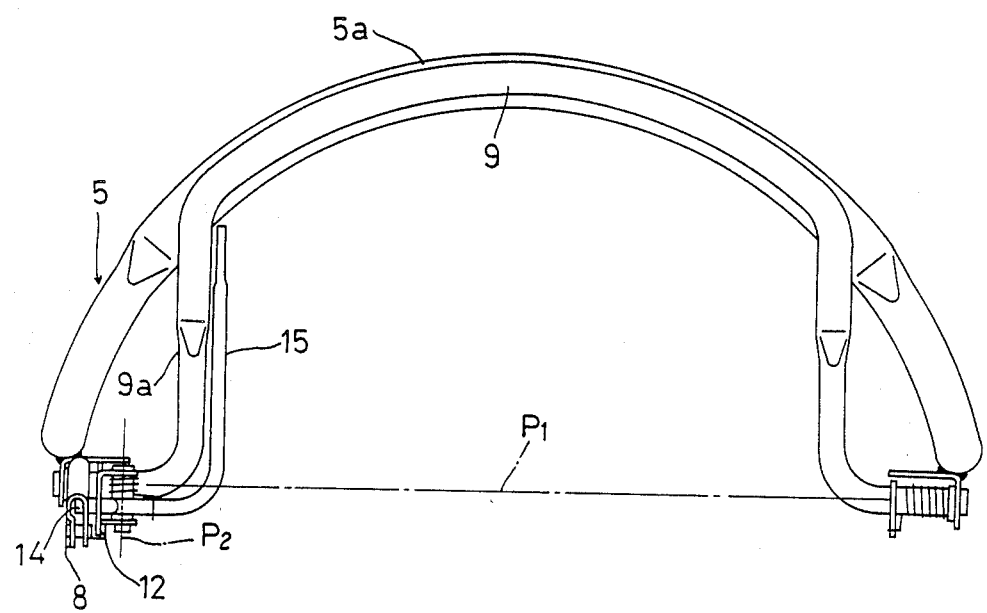
FIG. 12 is a rear view of a clutch lever of the further embodiment.
Figure 8:
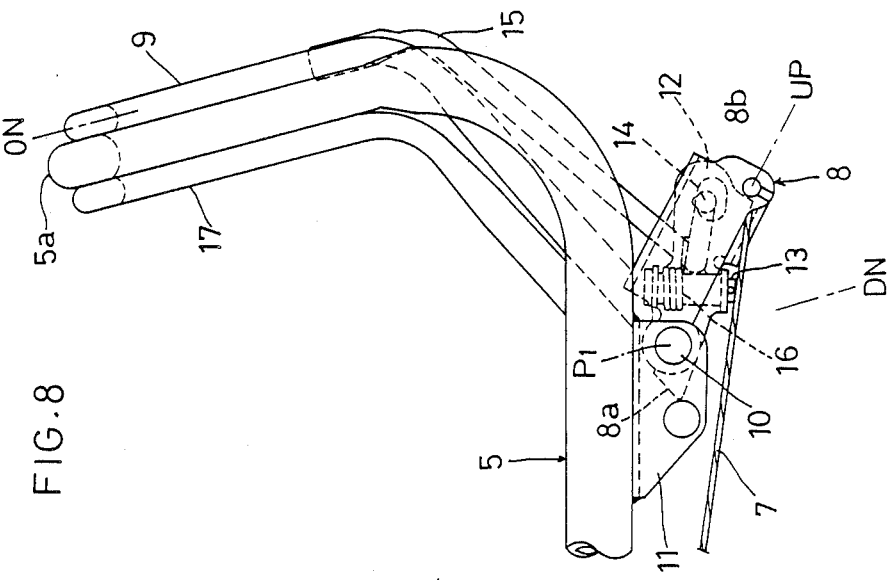
FIGS. 7 and 8 are side views of a clutch lever mounting section of a further embodiment, respectively.
Figure 7:
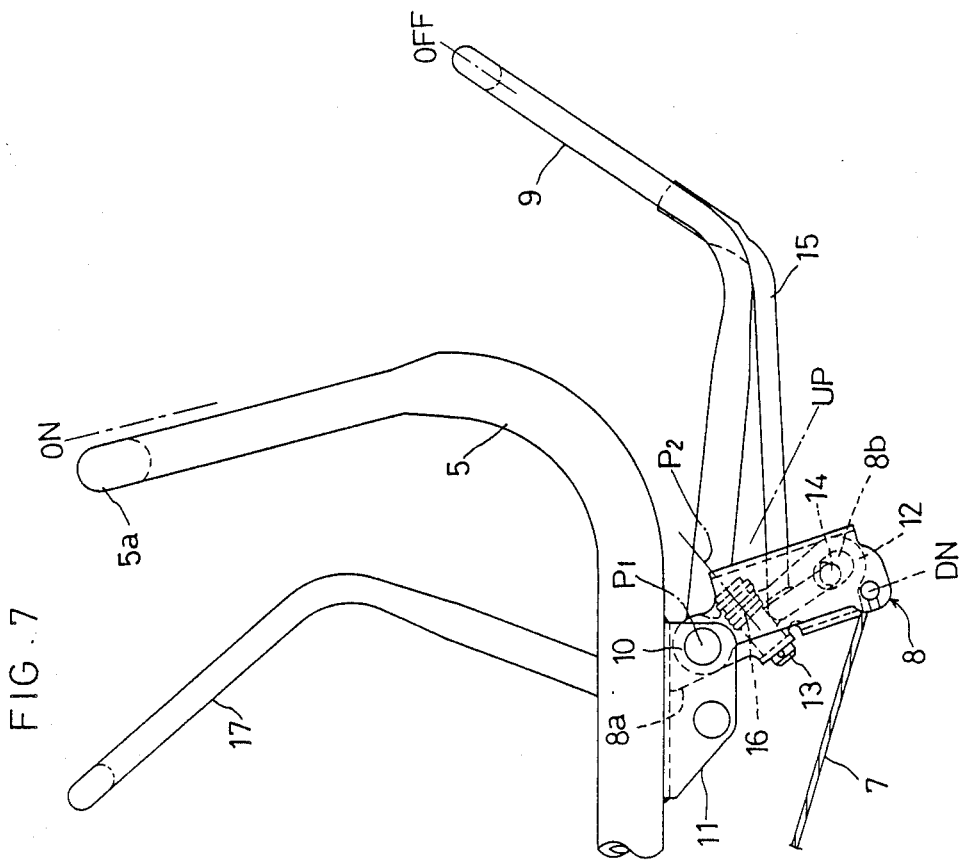
Figure 9:
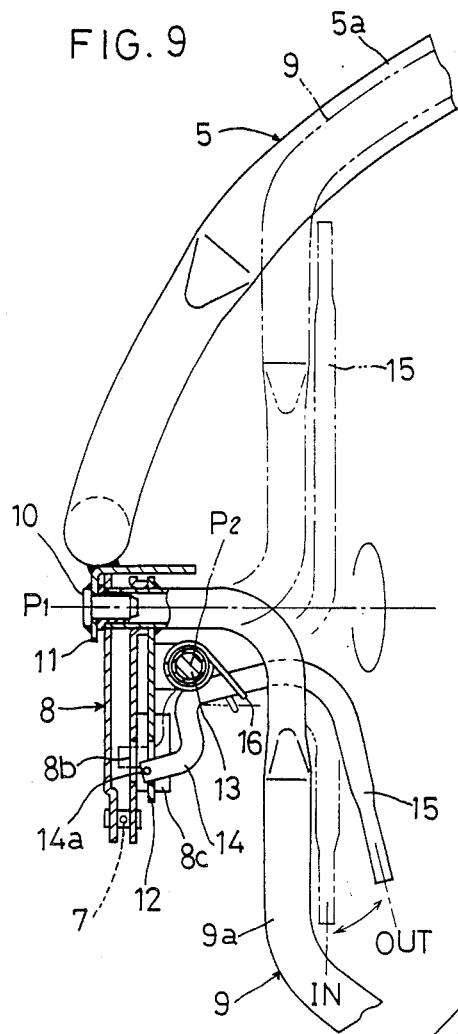
FIG. 9 is a rear view of an interlocking mechanism of the further embodiment.
Figure 10:
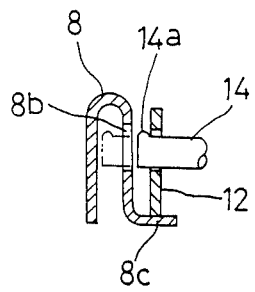
FIG. 10 is a sectional view of a control device of the further embodiment.
Figure 11:
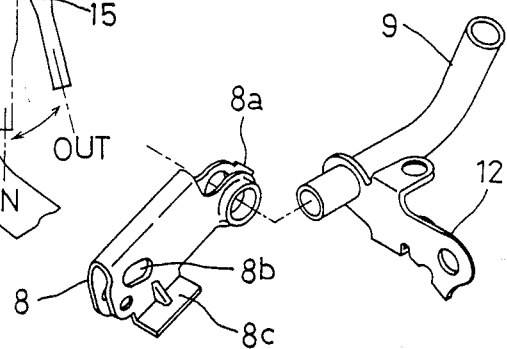
FIG. 11 is a perspective view of the control device and a support arm of the further embodiment.

Referring to FIGS. 2 through 4, a clutch control device 8 is connected through a release wire 7 to a cutting blade clutch C mounted in the blade housing 4 for making and breaking drive transmission from the engine E to the cutting blade 3. The clutch control device 8 is attached to the steering handle 5 through a clutch lever 9, which is shaped as shown in FIG. 6, a lever pivot pin 10 and a lever mounting bracket 11, to be pivotable relative to the steering handle 5 about a pivotal axis P1 of the clutch lever 9. The cutting blade clutch C becomes disengaged under a self-restoring force when the control device 8 moves to a down position DN as a second corresponding position with a proximal end 8a thereof contacting an undersurface of the lever mounting bracket 11.

The clutch lever 9 carries at an end thereof an interlocking member 14 formed of a rod material, through a support arm 12 urged to pivot with the clutch lever 9. The interlocking member 14 is provided for releasably interlocking the clutch lever 9 and the control device 8. The interlocking member 14 is slidable parallel to the axis P1 to switch between an operative position with a tip end thereof inserted into an engagement bore 8b of the control device 8 as shown in a phantom line in FIG. 4 whereby the control device 8 and the support arm 12 are pivotable together, and a release position with the tip end thereof disengaged from the control device 8 as shown in a solid line whereby the control device 8 and the support arm 12 are pivotable relative to each other. A control lever 15 is formed integral with the interlocking member 14 for effecting the switching operation. The control lever 15 includes a connection 15a connected to the clutch lever 9, and a spring 16 acts on the connection 15a to urge the interlocking member 14 to the release position. The tip end of the interlocking member 14 is aligned with the engagement bore 8b only when the clutch lever 9 and the control device 8 are in such a relative position that a free end of the support arm 12 is in contact with a stopper 8c defined on the control device 8 as shown in FIG. 5. The self-restoring force of the cutting blade clutch C places the control device 8 in the down position DN, and the clutch lever 9 is movable to a declutching position OFF as a second position as shown in FIG. 2, which is the above-mentioned position relative to the control device 8 in the down position DN. Only in this position the clutch lever 9 may be interlocked with the control device 8 by manually sliding the control lever 15 from a non-interlocking position OUT away from a vertical rod portion 9a of the clutch lever 9 to an interlocking position IN adjacent the vertical rod portion 9a to switch the interlocking member 14 from the release position to the operative position. In this position the clutch lever 9 is pivotable about the axis P1 into a clutch engaging position ON as a first position as shown in FIG. 3, with a free intermediate portion thereof located adjacent a grip portion 5a of the steering handle 5 for the operator to grip the clutch lever 9 and the steering handle 5 together. As a result, the control device 8 is moved to an up position UP as a first corresponding position to engage the cutting blade clutch C. A slight relative pivoting movement occurs at this time between the control device 8 and the support arm 12 due to the self-restoring force of the cutting blade clutch C, the manual force applied to the clutch lever 9, and the engagement bore 8b having a size slightly greater than the diameter of interlocking member 14. The interlocking member 14 is maintained in the operative position in spite of the force of spring 16 without a manual force since the interlocking member 14 includes a retaining projection 14a engaging the control device 8 as a result of the relative pivotal movement between the control device 8 and the support arm 12. When the operator releases the clutch lever 9 in the clutch engaging position ON, the self-restoring force of the cutting blade clutch C automatically returns the clutch lever 9 to the declutching position OFF and the control device 8 to the down position DN. At the same time the interlocking member 14 is automatically switched to the release position under the force of spring 16.

Thus, the cutting blade clutch C is not engaged simply by switching the clutch lever 9 to the clutch engaging position ON. The cutting blade clutch C is engaged to drive the cutting blade 3 only when the control lever 15 is operated to switch the interlocking member 14 to the operative position and the clutch lever 9 is switched to the clutch engaging position ON. A mowing operation is carried out with the cutting blade clutch C engaged while the operator grips the steering handle 5 and the clutch lever 9 in the clutch engaging position ON.

A control lever 17 in FIGS. 2 and 3 is provided for operating a propelling clutch not shown.

Another embodiment is shown in FIGS. 7 through 12, which is different from the foregoing embodiment in the following respect:

This embodiment includes an interlocking member 14 and an interlocking control lever 15 pivotable about an axis P2 perpendicular to the pivotal axis P1 of the clutch lever 9 to switch between an operative position to engage the control device 8 and a release position disengaged from the control device 8, or attached to the clutch lever 9 to be switchable between an interlocking position IN adjacent the vertical rod portion 9a of the clutch lever 9 and a non-interlocking position OUT away from the vertical rod portion 9a.

The interlocking mechanism between the control device 8 and the clutch lever 9 may be constructed such that the interlocking member is maintained in the operative position by gripping the interlocking control lever with the clutch lever.

What is claimed is:

1. A clutch control structure for a walking operator type lawn mower comprising
   a cutting blade clutch (C) for making and breaking drive transmission to a cutting blade (3),
   a steering handle (5) including a grip portion (5a),
   a clutch lever (9) pivotable between a first position and a second position,
   a control device (8) operatively connected to said cutting blade clutch (C) and pivotable between a first corresponding position corresponding to said first position for engaging said cutting blade clutch (C) and a second corresponding position corresponding to said second position for disengaging said cutting blade clutch (C), said control device (8) being constantly urged to said second corresponding position for disengaging said cutting blade clutch (C), and
   an interlocking member (14) manually switchable between a release position for breaking an engagement between said control device (8) and said clutch lever (9) to allow said control device (8) and said clutch lever (9) to be operable independently of each other, and an operative position for establishing the engagement between said control device (8) and said clutch lever (9) to allow said control device (8) and said clutch lever (9) to be operable together, said interlocking member (14) being constantly urged to said release position,
   wherein said cutting blade clutch (C) is engaged by maintaining said interlocking member (14) in said operative position and moving said clutch lever (9) to said first position.

2. A clutch control structure as claimed in claim 1, wherein said first position of said clutch lever (9) is an upper position adjacent said grip portion (5a) and said second position is a lower position away from said grip portion (5a), said clutch lever (9) being manually pivotable between said first position and said second position about an axis (P1) provided by said steering handle (5), and said control device (8) is pivotable between said first corresponding position and said second corresponding position about said axis (P1).

3. A clutch control structure as claimed in claim 2, wherein said interlocking member (14) is pivotable between said operative position and said release position about an axis (P2) perpendicular to said axis (P1).

4. A clutch control structure as claimed in claim 2, wherein said interlocking member (14) is slidable parallel to said axis (P1) between said operative position and said release position.

5. A clutch control structure as claimed in claim 1, wherein said interlocking member (14) is urged by a spring to said release position.

6. A clutch control structure as claimed in claim 1, wherein said interlocking member (14) is switchable between said operative position and said release position by movement thereof into and out of an engagement bore (8b) defined in said control device (8).

7. A clutch control structure as claimed in claim 6, wherein said control device (8) includes a stopper (8c) for setting a positional relationship between said control device (8) and an arm (12) attached to said clutch lever (9) when said interlocking member (14) is moved into said engagement bore (8b).

8. A clutch control structure as claimed in claim 6, wherein said interlocking member (14) includes a retaining projection (14a) for preventing said interlocking member (14) from becoming disengaged from said engagement bore (8b) of said control device (8) when said interlocking member (14) is in said operative position and said clutch lever (9) is in said first position.

9. A clutch control structure as claimed in claim 1, wherein said interlocking member (14) is integrally provided with an interlocking control device (15), said interlocking member (14) being operable by a manual control of said interlocking control device (15).

10. A clutch control structure as claimed in claim 8, wherein said interlocking control device (15) extends along part of said clutch lever (9).

* * * * *